(12) United States Patent
Adachi et al.

(10) Patent No.: US 7,840,654 B2
(45) Date of Patent: Nov. 23, 2010

(54) METHOD AND APPARATUS FOR PROCESSING WEB SERVICE WITH MANAGEMENT INFORMATION

(75) Inventors: Isamu Adachi, Yokohama (JP); Satoshi Yamaguchi, Yamato (JP)

(73) Assignee: Hitachi, Ltd., Tokyo (JP)

(*) Notice: Subject to any disclaimer, the term of this patent is extended or adjusted under 35 U.S.C. 154(b) by 63 days.

(21) Appl. No.: 12/232,687

(22) Filed: Sep. 23, 2008

(65) Prior Publication Data
US 2009/0106344 A1 Apr. 23, 2009

Related U.S. Application Data

(63) Continuation of application No. 10/807,151, filed on Mar. 24, 2004, now abandoned.

(30) Foreign Application Priority Data

Mar. 26, 2003 (JP) .............................. 2003-084085
Jan. 23, 2004 (JP) .............................. 2004-015117

(51) Int. Cl.
*G06F 15/177* (2006.01)
*G06F 15/16* (2006.01)
*G06F 13/00* (2006.01)
*G06Q 30/00* (2006.01)

(52) U.S. Cl. ...................... 709/220; 709/228; 710/104; 705/26

(58) Field of Classification Search ................. 709/220, 709/228; 710/104; 717/11; 705/26
See application file for complete search history.

(56) References Cited

U.S. PATENT DOCUMENTS 6,701,324 B1* 3/2004 Cochran et al. ........... 707/104.1
6,748,447 B1* 6/2004 Basani et al. ............... 709/244
2002/0065918 A1* 5/2002 Shastri ......................... 709/226

OTHER PUBLICATIONS

Java Web Services, D. Chappell et al.

* cited by examiner

*Primary Examiner*—Ario Etienne
*Assistant Examiner*—Ho Shiu
(74) *Attorney, Agent, or Firm*—Brundidge & Stanger, P.C.

(57) ABSTRACT

The present invention provides service processing used in a computer system comprising a plurality of computers, each of which receives a message and executes a Web service on the basis of the message and then outputs a message generated from the result of the execution. The computer system realizes a Web service by transmitting and receiving the message among the computers. A message including first information about the execution of the service, and second information about notification of progress information in the service, is received. The service is executed according to the first information, and then the second information is analyzed. After that, on the basis of the execution result of the service, a message is generated according to the second information, and the message is then transmitted to the computer that is identified by a destination of progress information notification included in the second information.

2 Claims, 11 Drawing Sheets

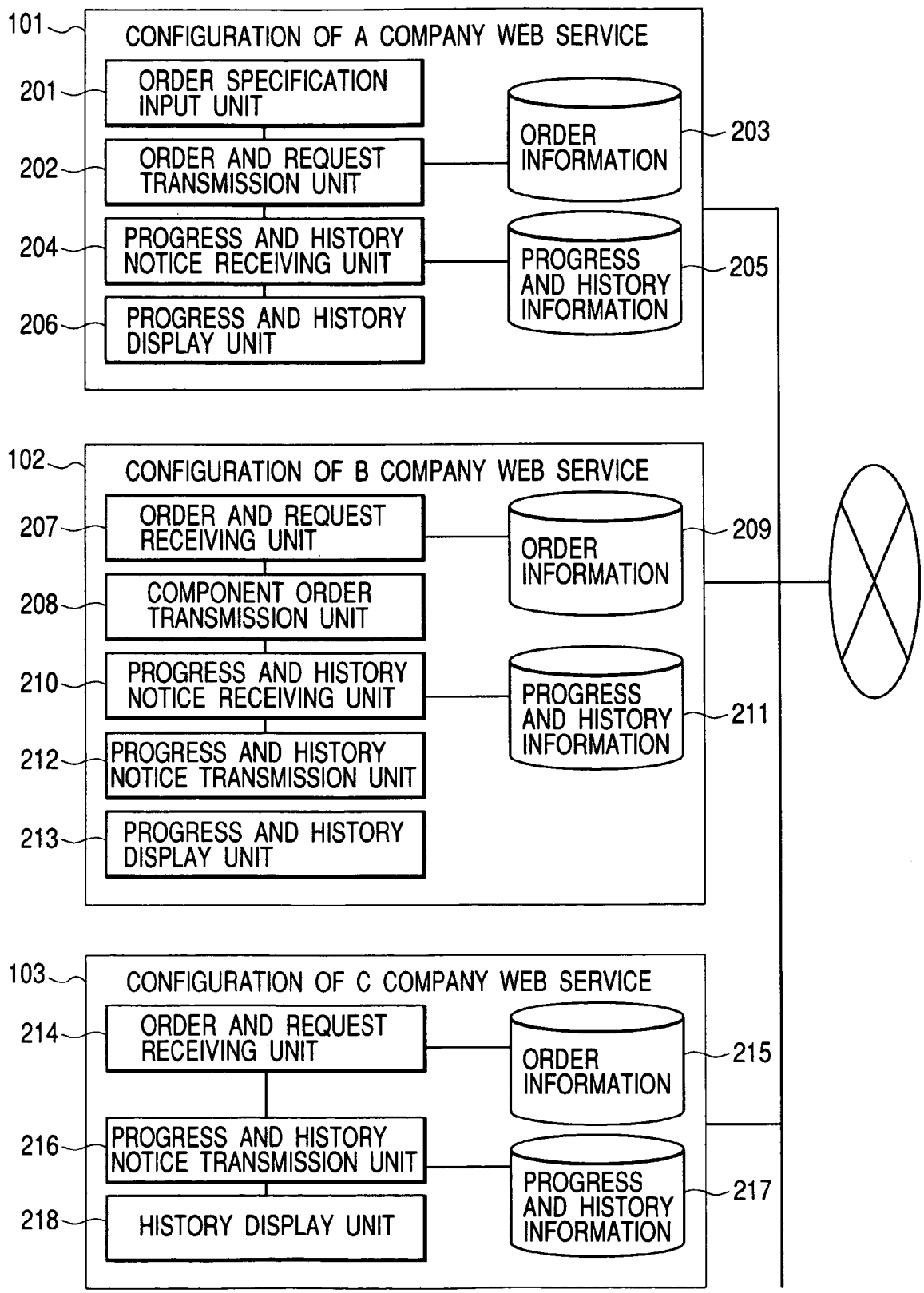

FIG. 4

107 ORDER OF CUSTOM-ORDERED SYSTEM

401 ORDER SPECIFICATION DATA OF CUSTOM-ORDERED SYSTEM EQUIPMENT

<ORDER SPECIFICATION OF CUSTOM-ORDERED SYSTEM EQUIPMENT>
<SYSTEM TYPE> GENERAL-PURPOSE SYSTEM 2 TYPE </SYSTEM TYPE>
<NUMBER OF ORDERS> 3 </NUMBER OF ORDERS>
<DELIVERY DATE> 2002/5/21 </DELIVERY DATE>
<ADDED OPTIONAL DEVICE> MEMORY EXPANSION </ADDED OPTIONAL DEVICE>
<ADDED OPTIONAL DEVICE> NIC EXTENSION </ADDED OPTIONAL DEVICE>
</ORDER SPECIFICATION OF CUSTOM-ORDERED SYSTEM EQUIPMENT>

402 PROGRESS INFORMATION REQUEST DATA

403 — <PROGRESS INFORMATION REQUEST>
404 — <DESTINATION OF PROGRESS INFORMATION NOTIFICATION>
http://www.companyA.com/WebServiceA
</DESTINATION OF PROGRESS INFORMATION NOTIFICATION>
405 — <REQUESTER ID> 000A012 </REQUESTER ID>
406 — <DEGREE OF DETAILS OF RETURN INFORMATION> MAXIMUM </DEGREE OF DETAILS OF RETURN INFORMATION>
407 — <HIERARCHICAL LEVEL> 2 </HIERARCHICAL LEVEL>
</PROGRESS INFORMATION REQUEST>

FIG. 5

108 ORDER OF BASIC CONFIGURATION EQUIPMENT

501 ORDER SPECIFICATION DATA OF BASIC CONFIGURATION EQUIPMENT

```
<ORDER SPECIFICATION OF BASIC CONFIGURATION EQUIPMENT>
  <SYSTEM TYPE> GENERAL-PURPOSE SYSTEM 2 TYPE </SYSTEM TYPE>
  <NUMBER OF ORDERS> 3 </NUMBER OF ORDERS>
  <DELIVERY DATE> 2002/4/20 </DELIVERY DATE>
</ORDER SPECIFICATION OF BASIC CONFIGURATION EQUIPMENT>
```

502 PROGRESS INFORMATION REQUEST DATA (FOR A COMPANY WEB SERVICE)

```
<PROGRESS INFORMATION REQUEST>
  <DESTINATION OF PROGRESS INFORMATION NOTIFICATION>
    http://www.companyA.com/WebServiceA
  </DESTINATION OF PROGRESS INFORMATION NOTIFICATION>
  <REQUESTER ID> 000A012 </REQUESTER ID>
  <DEGREE OF DETAILS OF RETURN INFORMATION> MAXIMUM </DEGREE OF DETAILS OF RETURN INFORMATION>
  <HIERARCHICAL LEVEL> 1 </HIERARCHICAL LEVEL>
</PROGRESS INFORMATION REQUEST>
```

504 — `<PROGRESS INFORMATION REQUEST>`
404 — `<DESTINATION OF PROGRESS INFORMATION NOTIFICATION>`
405 — `<REQUESTER ID>`
406 — `<DEGREE OF DETAILS OF RETURN INFORMATION>`
505 — `<HIERARCHICAL LEVEL>`

503 PROGRESS INFORMATION REQUEST DATA (FOR B COMPANY WEB SERVICE)

```
<PROGRESS INFORMATION REQUEST>
  <DESTINATION OF PROGRESS INFORMATION NOTIFICATION>
    http://www.Bcompany.co.jp/WebServiceB
  </DESTINATION OF PROGRESS INFORMATION NOTIFICATION>
  <REQUESTER ID> B001023 </REQUESTER ID>
  <DEGREE OF DETAILS OF RETURN INFORMATION> MAXIMUM </DEGREE OF DETAILS OF RETURN INFORMATION>
  <HIERARCHICAL LEVEL> 2 </HIERARCHICAL LEVEL>
</PROGRESS INFORMATION REQUEST>
```

506 — `<PROGRESS INFORMATION REQUEST>`
507 — `<DESTINATION OF PROGRESS INFORMATION NOTIFICATION>`
508 — `<REQUESTER ID>`
509 — `<DEGREE OF DETAILS OF RETURN INFORMATION>`
510 — `<HIERARCHICAL LEVEL>`

FIG. 6

109 ORDER OF OPTIONAL DEVICE

601 ORDER SPECIFICATION DATA OF OPTIONAL DEVICE

<ORDER SPECIFICATION OF OPTIONAL DEVICE>
  <DEVICE TYPE> MEMORY </DEVICE TYPE>
  <NUMBER OF ORDERS> 3 </NUMBER OF ORDERS>
  <DELIVERY DATE> 2002/4/20 </DELIVERY DATE>
</ORDER SPECIFICATION OF OPTIONAL DEVICE><ORDER SPECIFICATION OF OPTIONAL DEVICE>
  <DEVICE TYPE> NIC </DEVICE TYPE>
  <NUMBER OF ORDERS> 3 </NUMBER OF ORDERS>
  <DELIVERY DATE> 2002/4/20 </DELIVERY DATE>
</ORDER SPECIFICATION OF OPTIONAL DEVICE>

502 PROGRESS INFORMATION REQUEST DATA (FOR A COMPANY WEB SERVICE)

504 — <PROGRESS INFORMATION REQUEST>
404 — <DESTINATION OF PROGRESS INFORMATION NOTIFICATION>
       http://www.companyA.com/WebServiceA
       </DESTINATION OF PROGRESS INFORMATION NOTIFICATION>
405 — <REQUESTER ID> 000A012 </REQUESTER ID>
406 — <DEGREE OF DETAILS OF RETURN INFORMATION> MAXIMUM </DEGREE OF DETAILS OF RETURN INFORMATION>
505 — <HIERARCHICAL LEVEL> 1 </HIERARCHICAL LEVEL>
       </PROGRESS INFORMATION REQUEST>

503 PROGRESS INFORMATION REQUEST DATA (FOR B COMPANY WEB SERVICE)

506 — <PROGRESS INFORMATION REQUEST>
507 — <DESTINATION OF PROGRESS INFORMATION NOTIFICATION>
       http://www.Bcompany.co.jp/WebServiceB
       </DESTINATION OF PROGRESS INFORMATION NOTIFICATION>
508 — <REQUESTER ID> B001023 </REQUESTER ID>
509 — <DEGREE OF DETAILS OF RETURN INFORMATION> MAXIMUM </DEGREE OF DETAILS OF RETURN INFORMATION>
510 — <HIERARCHICAL LEVEL> 2 </HIERARCHICAL LEVEL>
       </PROGRESS INFORMATION REQUEST>

FIG. 8

801 <PROGRESS INFORMATION NOTIFICATION DATA OF B COMPANY WEB SERVICE

802 — <PROGRESS INFORMATION NOTIFICATION>
803 — <REQUESTER OF STATUS CHECK>
   http://www.companyA.com/WebServiceA
   </REQUESTER OF STATUS CHECK>
804 — <TARGET SERVICE>
   http://www.Bcompany.co.jp/WebServiceB
   </TARGET SERVICE>
812 — <PROGRESS INFORMATION SERVICE>
   http://www.Bcompany.co.jp/WebServiceProgressB
   </PROGRESS INFORMATION SERVICE>
805 — <REQUESTER ID> 000A012 </REQUESTER ID>
806 — <CURRENT STATUS>
807 — <SERVICE ID> B001023 </SERVICE ID>
808 — <SERVICE NAME> RECEPTION OF SYSTEM ORDER </SERVICE NAME>
809 — <DATE AND TIME> 2002/8/23 13:00:11 </DATE AND TIME>
810 — <TARGET PROCESS> TRANSMISSION PROCESSING OF COMPONENT ORDER </TARGET PROCESS>
811 — <STATE> COMPLETIED </STATE>
   </CURRENT STATUS>
   </PROGRESS INFORMATION NOTIFICATION>

FIG. 9

1001 DEFINITION OF PROGRESS INFORMATION REQUEST DATA

<!ELEMENT PROGRESS INFORMATION REQUEST (DESTINATION OF PROGRESS INFORMATION NOTICE, REQUESTER ID, DEGREE OF DETAILS OF RETURN INFORMATION, HIERARCHICAL LEVEL) >
<!ELEMENT DESTINATION OF PROGRESS INFORMATION NOTIFICATION (#PCDATA) >
<!ELEMENT REQUESTER ID (#PCDATA) >
<!ELEMENT DEGREE OF DETAILS OF RETURN INFORMATION (#PCDATA) >
<!ELEMENT HIERARCHICAL LEVEL (#PCDATA) >

FIG. 10

1002 DEFINITION OF PROGRESS INFORMATION NOTIFICATION DATA

<!ELEMENT REQUESTER OF STATUS CHECK (#PCDATA) >
<!ELEMENT TARGET SERVICE (#PCDATA) >
<!ELEMENT PROGRESS INFORMATION SERVICE (#PCDATA) >
<!ELEMENT REQUESTER ID (#PCDATA) >
<!ELEMENT PROGRESS INFORMATION NOTIFICATION (REQUESTER OF STATUS CHECK, TARGET SERVICE, REQUESTER ID, CURRENT STATUS) >
<!ELEMENT SERVICE ID (#PCDATA) >
<!ELEMENT SERVICE NAME (#PCDATA) >
<!ELEMENT DATE AND TIME (#PCDATA) >
<!ELEMENT TARGET PROCESSING (#PCDATA) >
<!ELEMENT STATE (#PCDATA) >
<!ELEMENT CURRENT STATUS (SERVICE ID, SERVICE NAME, DATE AND TIME, TARGET PROCESSING, STATE) >

FIG. 11

1100 MANAGEMENT TABLE OF PROGRESS INFORMATION REQUEST TO B COMPANY WEB SERVICE

| DESTINATION OF PROGRESS INFORMATION NOTIFICATION | REQUESTER ID | DEGREE OF DETAILS OF RETURN INFORMATION | HIERARCHICAL LEVEL | SERVICE ID |
|---|---|---|---|---|
| http://www.companyA.com/WebServiceA | 000A012 | MAXIMUM | 2 | B001023 |
| 1101 | 1102 | 1103 | 1104 | 1105 |

FIG. 12

1200 MANAGEMENT TABLE OF PROGRESS NOTIFICATION INFORMATION OF B COMPANY WEB SERVICE

| SERVICE ID | TRANSACTION NAME | TARGET PROCESSING | PERSON IN CHARGE | PROGRESS INFORMATION SERVICE | TARGET SERVICE ID | TARGET SERVICE NAME | TARGET UPDATE TIME | TARGET PROCESS | TARGET STATE |
|---|---|---|---|---|---|---|---|---|---|
| B001023 | RECEPTION OF SYSTEM ORDER | TRANSMISSION PROCESSING OF COMPONENT ORDER | HITACHI TARO | http://www.Bcompany.co.jp/WebServiceProgressB | C002045 | RECEPTION OF BASIC CONFIGURATION EQUIPMENT ORDER | 2002/8/23 13:00:11 | RECEPTION | COMPLETED |
| 1201 | 1202 | 1203 | 1204 | 1205 | 1206 | 1207 | 1208 | 1209 | 1210 |

FIG. 13

1300 MANAGEMENT TABLE OF PROGRESS NOTIFICATION INFORMATION OF A COMPANY WEB SERVICE

| SERVICE ID | TRANSACTION NAME | TARGET PROCESS | PERSON IN CHARGE | PROGRESS INFORMATION SERVICE | TARGET SERVICE ID | TARGET SERVICE NAME | TARGET UPDATE TIME | TARGET PROCESSING | TARGET STATE |
|---|---|---|---|---|---|---|---|---|---|
| 000A012 | ORDER OF CUSTOM-ORDERD SYSTEM | ORDER | HITACHI HANAKO | http://www.Bcompany.co.jp/WebServiceProgressB | B001023 | RECEPTION OF SYSTEM ORDER | 2002/8/23 13:00:11 | TRANSMISSION PROCESSING OF COMPONENT ORDER | COMPLETED |
| 000A012 | ORDER OF CUSTOM-ORDERD SYSTEM | ORDER | HITACHI HANAKO | http://www.CorporationC.co.jp/WebServiceProgressC | C002045 | RECEPTION OF BASIC CONFIGURATION EQUIPMENT ORDER | 2002/8/24 8:00:00 | RECEPTION OF DELIVERY NOTIFICATION OF BASIC CONFIGURATION EQUIPMENT | COMPLETED |
| 000A012 | ORDER OF CUSTOM-ORDERD SYSTEM | ORDER | HITACHI HANAKO | http://www.Bcompany.co.jp/WebServiceProgressB | B001023 | RECEPTION OF SYSTEM ORDER | 2002/8/24 8:00:00 | RECEPTION OF DELIVERY NOTIFICATION OF BASIC CONFIGURATION EQUIPMENT | COMPLETED |
|  |  |  |  |  |  |  |  |  |  |
|  |  |  |  |  |  |  |  |  |  |
| 1301 | 1302 | 1303 | 1304 | 1315 | 1306 | 1307 | 1308 | 1309 | 1310 |

METHOD AND APPARATUS FOR PROCESSING WEB SERVICE WITH MANAGEMENT INFORMATION

RELATED APPLICATIONS

The present application is a continuation application to U.S. patent application Ser. No. 10/807,151, filed Mar. 24, 2004, now abandoned which claims priority from the Japanese patent applications JP2003-084085 filed on Mar. 26, 2003 and JP2004-015117 filed on Jan. 23, 2004, the contents of those are hereby incorporated by reference into this application.

BACKGROUND OF THE INVENTION

The present invention relates to a technique for managing progress information and history information, which makes it possible to provide progress information and history information according to a service request.

In the conventional Web service (an apparatus, a system, or a program, which provides services by use of one Web as an I/F), information is exchanged between systems by use of an interface that has been determined in advance between two specific services. Even when handling notification of progress and history information, a specific interface is defined in advance between the services.

The technique including Web services is disclosed in "Java WebServices" by David A. Cbappell and others (publishing company: O'Reilly & Associates, Inc., 2002.3, pp. 3-9).

SUMMARY OF THE INVENTION

Heretofore, if a plurality of Web services are interfaced with one another to realize a series of functions, how to handle progress and history information to be exchanged among the Web services needs to be determined as an interface among specific Web services. Therefore, the following problem arises: in the event of a system in which a plurality of Web services are interfaced with one another, in order to manage progress and history information, a requester of progress and history information is required to issue a request in consideration of interfaces of all related Web services; accordingly, if the number of related Web services increases, processing becomes complicated in response to the number of combinations of the related Web services.

In addition, if Web services are interfaced with one another in multiple stages, i.e., if a Web service which directly receives a request sends a request to an unspecific Web service, interfaces of all related Web services cannot be taken into consideration, and there is also a case in which a progress request cannot be issued from a Web service other than a direct requester. In this case, progress and history information which can be obtained is limited to information which can be returned by the Web service that directly receives the request.

n object of the present invention is to provide a service processing method capable of dynamically controlling the obtaining of history information and progress information, and an apparatus thereof.

According to the present invention, the above-mentioned problems are solved by the following steps: without individually determining an interface of progress and history information among specific systems, prescribing an information format used to exchange progress and history information among a plurality of systems; then issuing a request for progress and history information together with an individual API request; and when a state changes in each Web service, transmitting required information in the common format.

BRIEF DESCRIPTION OF THE DRAWING

FIG. 3 is a diagram illustrating how systems of an A Company, a B Company, and a C Company are configured;

FIG. 4 is a diagram detailing order specification data transmitted from an A Company Web service to a B Company Web service;

FIG. 5 is a diagram detailing data of an order of basic configuration equipment, which is transmitted from the B Company Web service to a C Company Web service;

FIG. 6 is a diagram detailing data of an order of basic configuration equipment, which is transmitted from the B Company Web service to the C Company Web service;

FIG. 8 is a diagram detailing contents of progress information notification data of the B Company Web service;

FIG. 9 is a diagram illustrating how a format of progress information request data is defined;

FIG. 10 is a diagram illustrating how a format of progress information notification data is defined;

FIG. 11 is a table for managing progress information request data that is transmitted to the B Company Web service;

FIG. 12 is a table used for managing progress notification information of the B Company Web service; and FIG. 13 is a table used for managing progress notification information of the A Company Web service.

DESCRIPTION OF THE PREFERRED EMBODIMENTS

Figure 1A:
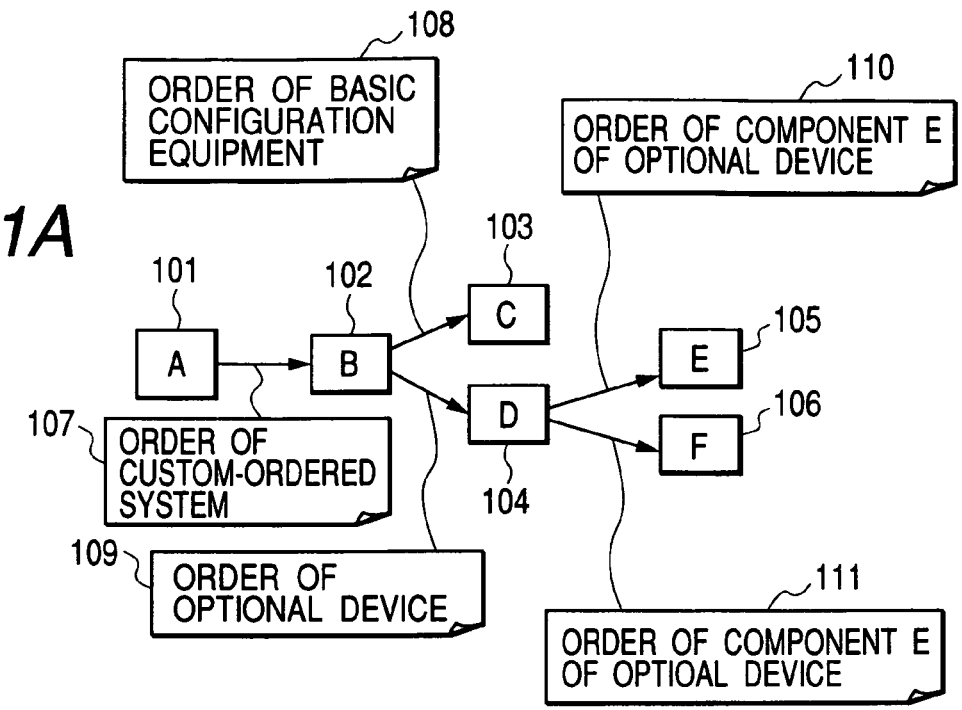
FIG. 1A is a diagram illustrating an example of a service request adopted when an online order system is built by combining a plurality of Web services together.
Figure 1B:
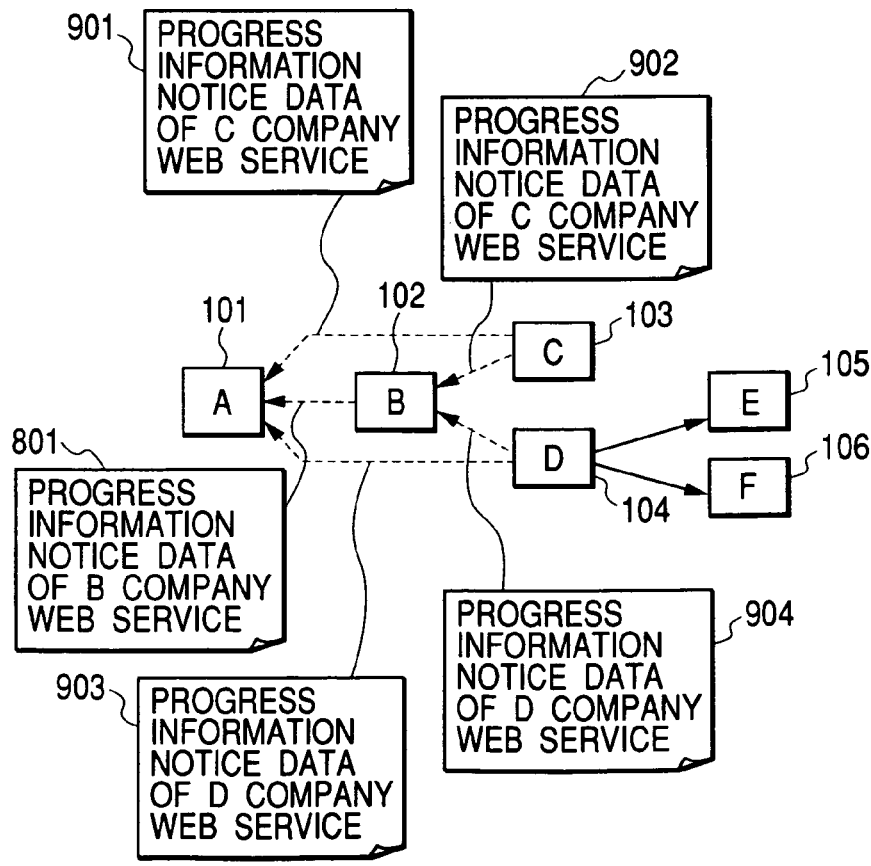
FIG. 1B is a diagram illustrating an example of service progress notification adopted when an online order system is built by combining a plurality of Web services together.

FIGS. 1A and 1B are diagrams each illustrating an example in which a plurality of Web services are combined to build an online order system.

Reference numeral 101 in FIG. 1A denotes an A Company Web service used for an order system which places an order of custom-ordered system equipment from an A Company. Reference numeral 102 in FIG. 1A denotes a B Company Web service. With respect to the custom ordered system, the order of which is received from the A Company, the B Company Web service transmits an order of the basic configuration equipment to a C Company Web service 103 shown in FIG. 1A, and also transmits an order of an optional device to a D Company Web service 104 shown in FIG. 1A.

Moreover, the Company D Web service 104 transmits an order of a component of the optional device to an E Company Web service 105 shown in FIG. 1A, and transmits an order of another component of the optional device to a F Company Web service 106 shown in FIG. 1A.

Reference numeral 107 in FIG. 1A denotes transmit data of the order of the custom-ordered system equipment, which is transmitted from the A Company Web service 101 to the B Company Web service 102. Reference numeral 108 in FIG. 1A denotes transmit data of the order of the basic configuration equipment, which is transmitted from the B Company Web service to the C Company Web service. Reference numeral 109 in FIG. 1A denotes transmit data of the order of the optional device, which is transmitted from the B Company Web service to the D Company Web service. Reference numeral 110 in FIG. 1A denotes transmit data of the order of the optional device, which is transmitted from the D Company Web service to the E Company Web service. Reference numeral 111 in FIG. 1A denotes transmit data of the order of the optional device, which is transmitted from the D Company Web service to the F Company Web service.

As for a request for the order of the custom-ordered system equipment 107 coming from the A Company Web service, a message 801 in FIG. 1B includes progress information notification data of the B Company Web service which is transmitted from the B Company Web service to the A Company Web service.

Messages 901 and 902 are progress information notification data of the C Company Web service. When a state of the C Company Web service changes, the messages 901 and 902 are transmitted as data having a format similar to that of the progress information notification data 901 of the B Company Web service.

The progress information notification data 901 of the C Company Web service is progress information notification data corresponding to progress information request data (for the A Company Web service) 502 transmitted through the B Company Web service. The progress information notification data 902 of the C Company Web service is progress information notification data corresponding to progress information request data (for the B Company Web service) 503.

In a similar manner, messages 903 and 904 are progress information notification data of the D Company Web service. When a state of the D Company Web service changes, the messages 903 and 904 are transmitted as data having a format similar to that of the progress information notification data 801 of the B Company Web service.

The progress information notification data 903 of the D Company Web service is progress information notification data corresponding to progress information request data (for the A Company Web service) 502 transmitted through the B Company Web service. The progress information notification data 904 of the D Company Web service is progress data corresponding to progress information request data (for the B Company Web service) 503.

Figure 2:
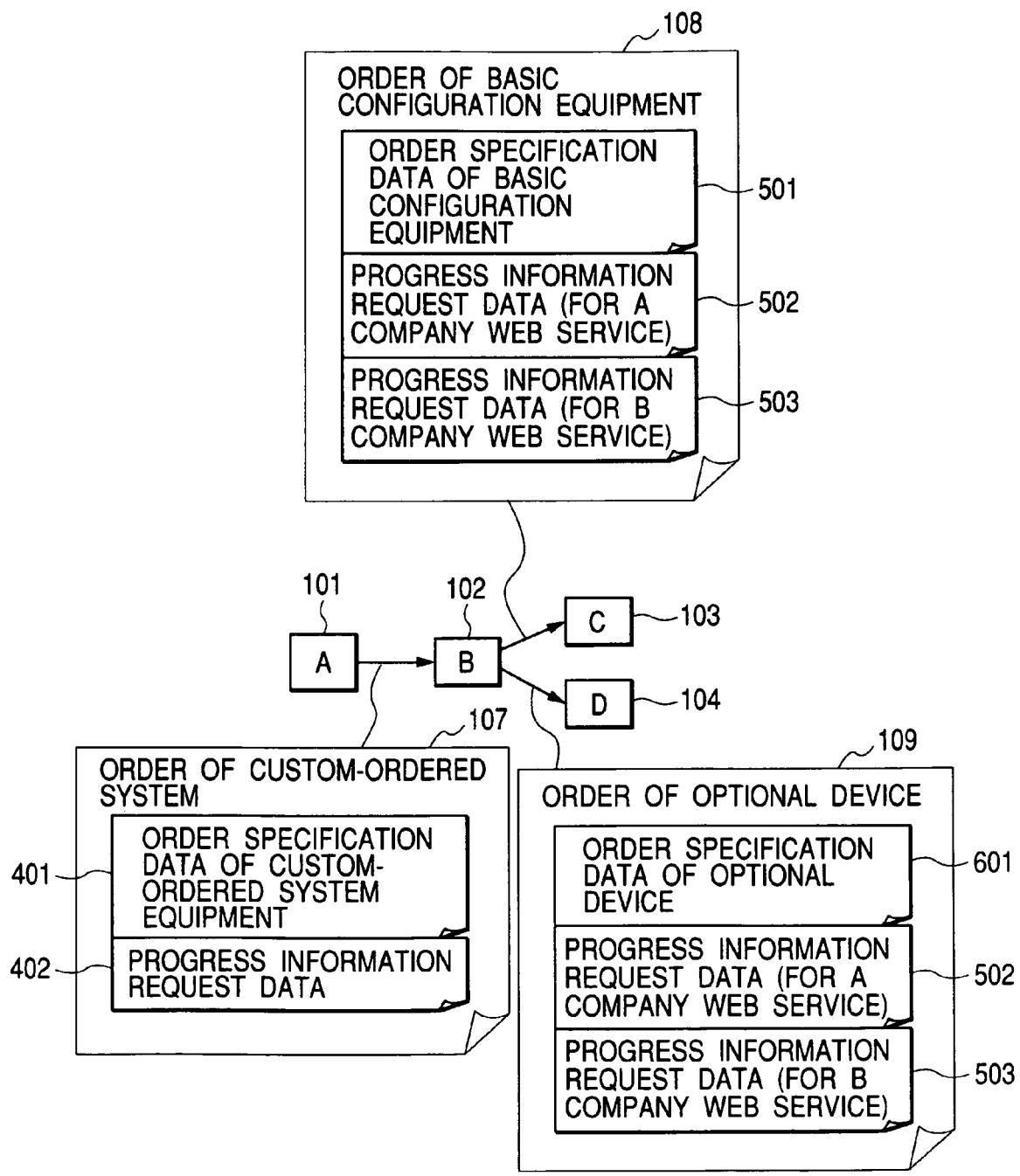
FIG. 2 is a diagram detailing a configuration of request data transmitted from each Web service.

FIG. 2 is a diagram illustrating a part of the processing shown in FIGS. 1A and 1B, in which the C Company Web service 103 and the D Company Web service 104 are called from the A Company Web service 101 through the B Company Web service 102. In addition to it, FIG. 2 illustrates details of the request data.

The order of custom-ordered system equipment 107 is order data transmitted from the A Company Web service 101 to the B Company Web service. The order of custom-ordered system equipment 107 includes order specification data of the custom-ordered system equipment shown in a message 401 in FIG. 4, and progress information request data 402 used in a Web service history and progress management method. In this embodiment, information included in both of the messages 401 and 402 is described on the basis of the XML format as an example. The present invention is not limited to the XML.

In a similar manner, the order of basic configuration equipment 108 shown in FIG. 2 is order data from the B Company Web service to the C Company Web service. The order of basic configuration equipment 108 includes order specification data 501 of the basic configuration equipment in FIG. 5, progress information request data (for the A Company Web service) 502, and progress information request data (for the B Company Web service) 503. The order of optional device 109 shown in FIG. 2 is order data from the B Company Web service to the D Company Web service. The order of optional device 109 includes order specification data 601 of the optional device in FIG. 6, progress information request data (for the A Company Web service) 502, and progress information request data (for the B Company Web service) 503.

FIG. 3 is a diagram illustrating how systems of an A Company, a B Company, and a C Company, which are shown in FIG. 1, are configured.

To be more specific, FIG. 3 illustrates in detail how the A Company Web service 101, the B Company Web service 102, and the C Company Web service 103 are configured. The A Company Web service 101 has an order specification input unit 201 for inputting specifications of the custom-ordered system, an order and request transmission unit 202, and an order information storing area 203 for storing transmitted order data. In addition, the A Company Web service 101 also has a progress and history notification receiving unit 204 for receiving progress and history information from the other systems, a progress and history information storing area 205 for storing the information, and a progress and history display unit 206 for displaying a stored history.

The B Company Web service 102 has the following: an order and request receiving unit 207 for receiving order data transmitted from the A Company, and the like; a component order transmission unit 208 for transmitting an order request for a component to the C Company Web service and the D Company Web service; and an order information storing area 209 for storing order data. In addition, the B Company Web service 102 has a progress and history notification receiving unit 210 for receiving progress and history information; a progress and history notification storing area 211 for storing the received progress and history information; a progress and history notification transmission unit 212 for transmitting progress and history information; and a progress and history display unit 213 for displaying progress and history information.

The C Company Web service 103 has an order and request receiving unit 214 for receiving order data transmitted from the B Company, and the like, and an order information storing area 215 for storing order data. In addition, the C Company Web service 103 has the following: a progress and history information transmission unit 216 for transmitting progress and history information; a progress and history information storing area 217 for storing the progress and history information; and a progress and history display unit 218 for displaying progress and history information. These Web services 101 through 103 are realized by use of information processing devices. The processing units 201 through 206, 207, 208, 210 through 213, 214, 216, 218 are functions achieved by the execution of programs. The information 203, 205, 209, 211, 215, 217 are stored in storage devices including a memory and a magnetic disk.

The order specification data 401 shown in FIG. 4 is order specification data used to specify the order for the custom-ordered system equipment, which is transmitted from the A Company Web service to the B Company Web service. The order specification data 401 is specified when using each function of the Web services. Contents of the order specification data 401 correspond to contents of each Web service. The order specification data of the custom-ordered system equipment includes a system type, the number of orders, the delivery date, an additional optional device, and another additional optional device which are specified to be "general-purpose system 2 type", "3", "May 21, 2002", "memory expansion", and "NIC expansion" respectively. This data is required for each service to perform services. A format for specifying the data is determined on the basis of contents of each service. The order specification data 401 shown in FIG. 4 is one example of how the format is determined.

The progress information request data 402 is information that is used to pass history request information many times among the plurality of Web services, and thereby to manage history and progress information of the plurality of systems. Reference numeral 1001 in FIG. 9 shows definitions of a format of the progress information request data 402. Information 403 through 407 in FIG. 4 corresponds to progress information request data, a destination of progress information notification, a requester ID, a degree of details of return information, a hierarchical level respectively, all of which are defined in the definition of progress information request data 1001. Each of the above-mentioned items will be described in detail by use of an example as below.

The progress information request data 402 shows details of the progress information request data. With the object of indicating that the progress information request data 402 is an information group used to notify the A Company Web service of progress information, information 403 specifies "progress information request". The information 403 defines a progress information request that includes information 404 through 407 used to notify the progress information.

Information 404 is a destination of progress information notification. Information indicating a destination which is notified of progress information is set. In this embodiment, information used to receive progress information of the A Company Web service is set by use of an URL.

In this embodiment, the A Company Web service sets the data as the progress information request in the progress information request data 402. However, the following method can also be used: apart from the A Company Web service, providing another Web service that manages progress information and history information; and as a destination of progress information notification of the information 404, instead of specifying information used to receive progress information of the A Company Web service, specifying a progress-information use URL of the Web service for managing progress information and history information, which has been provided apart from the A Company Web service.

Information 405 is a requester ID. What is specified is data obtained by numbering a requester with the object of managing order data of the A Company Web service. If this requester ID is specified in the progress information notification data when transmitting the progress information notification data from the B Company Web service to the A Company Web service, the A Company Web service can identify an order corresponding to this progress information notification. In this embodiment, "000A012" is specified as the requester ID. However, if a requester ID can be used to identify order data which is a request from the A Company Web service and to identify progress information notification data which is transmitted from each of the other Web services in association with the order data, other formats may also be used as a character string and a numerical value.

Information 406 is data indicating a degree of details of return information. This is information that indicates a unit of transmission of progress information management, of which the A Company is notified. In this embodiment, "maximum" is specified. This indicates that as progress information of business logic in the B Company Web service that has received this new request data, progress information is returned in the maximum resolvable unit. When the degree of details of return information is "maximum", progress information is requested as detailed as possible; for example, if a business process of each service includes a plurality of operation steps, progress information of each operation step is requested.

For example, the business process includes operation steps of "receive processing", "inspection", "confirmation of delivery date", and "ordering", progress information is notified on an operation step basis. As the degree of details of return information, "debug", "maximum", "input/output", "minimum", "error", and the like, including the above-mentioned example, can also be specified as a unit of progress information to be notified. In this example, in the event of the "debug", the amount of progress information notification data is largest; and in the event of the "error", the amount of progress information notification data is smallest.

The degree of details of return information is a value indicating a unit expected by the A Company Web service that requests the progress information notification data. On the basis of the degree of details of return information, each service returns the progress information notification data in a unit that can be achieved by the service at the time of returning the progress information notification data. The "debug" is specified with the object of notifying further detailed progress information at a stage of handling each operation step to be notified in the event of "maximum". The "debug" is used for a test, or the like. In this case, detailed progress information required for the test is defined beforehand. The "input/output" indicates that progress notification information about input/output from/to a service other than this service is required; for example, a case where a request is received from another service, a case where a request is further issued to another service, or the like. Moreover, the "minimum" indicates that progress notification information is required at a minimum level which is considered by each service as a required minimum level. The "error" indicates that progress notification information is requested only when a problem which does not occur in usual operation occurs.

The degree of details of return information indicates a target unit of progress information. However, it is also possible to specify a classification, and a filter condition, of requested progress information so that only progress information relating to a specific classification is obtained; for example, only "start" and "completed" for a processing step such as a request to another Web system are obtained.

The hierarchical level, which is the information 407 in FIG. 4, is used to specify a notification range of progress information if a series of processing involves a plurality of Web services. The hierarchical level is specified as a numerical value equivalent to the number of stages that is counted from a first Web service. For example, when counting from a Web service that requests a service, a first destination Web service is a first stage. If the first destination Web service calls another Web service, said another Web service is a second stage. In other words, if progress up to two stages from the A Company Web service needs to be kept track of, for example, a hierarchical level of "2" is transmitted to the B Company Web service. The B Company Web service transmits a hierarchical level of "1" to the C Company Web service. Because the C Company Web service receives "1" as the hierarchical level, the C Company Web service judges that it is not necessary to transmit a progress information request to a Web service, a level of which is lower than the C Company Web service.

In the example of the information 407 shown in FIG. 4, "2" is specified. This shows that a range within which the A Company Web service is notified of progress information is two stages. With reference to FIG. 2, the B Company Web service 102, which is the first stage, and the C Company Web service 103 and the D Company Web service 104, which are the second stage, are requested to transmit progress information to the A Company Web service.

By setting the progress information request data 402 shown in FIG. 4, and then by issuing a request from the A Company Web service to the B Company Web service together with the order specification data 401, it is possible to notify progress information by use of data format, which is common to a plurality of Web services, without individually creating an interface of progress information among individual Web services to create processing that is specific to the individual Web services.

FIG. 5 illustrates contents of data to be transmitted as the order of basic configuration equipment 108 from the B Company Web service to the C Company Web service. The data includes the following: order specification data 501 of the basic configuration equipment, which shows contents of the order for basic configuration equipment; progress information request data (for the A Company Web service) used to request notification of progress information to the A Company Web service 502; and progress information request data (for the B Company Web service) 503 used to request notification of progress information to the B Company Web service.

The order specification data 501 in FIG. 5 is data relating to the order for basic configuration equipment. In this embodiment, a system type, the number of orders, the delivery date are specified to be "general-purpose system 2 type", "3", "Apr. 4, 2002" respectively. The system type and the number of orders have the same values as those in the order specification data 401 of the custom-ordered system equipment in FIG. 4. As for the delivery date, after the basic configuration equipment and the optional device are delivered, on the basis of the values of the order specification data 401 of the custom-ordered system equipment in FIG. 4, a value obtained by subtracting a period of time required for assembling is specified.

The progress information request data (for the A Company Web service) 502 shown in FIG. 5 is information used to return progress information to the A Company Web service. The progress information request data 502 is generated on the basis of the progress information request data 402 from the A Company Web service. Information ranging from a destination of progress information notification 404 to a degree of details of return information 406 is similar to progress request data 402 from the A Company Web service in FIG. 4. Because the progress information request data 502 is passed through the B Company Web service, "1" is specified as the hierarchical level 505 as a result of decrementing its value by one.

The progress information request data (for the B Company Web service) 503 shown in FIG. 5 is transmit data used to request transmission of progress information to the B Company Web service. The progress information request data 503 has a format similar to those of the progress information request data 402 and the progress information request data 502. Information 507 shown in FIG. 5 is a destination of progress information notification, which specifies an URL indicating a destination of progress and history notification information of the B Company Web service. Information 508 is an ID for identifying a specific order, which is set by the B Company Web service. In this embodiment, a degree of details of return information 509 is specified to be "maximum"; and a hierarchical level 510 is specified to be "2".

FIG. 6 illustrates contents of data to be transmitted as the order of the optional device 109 from the B Company Web service to the D Company Web service. The data includes the following: order specification data 601 of the optional device, which shows contents of the order for the optional device; progress information request data (for the A Company Web service) used to request notification of progress information to the A Company Web service 502; and progress information request data (for the B Company Web service) 503 used to request notification of progress information to the B Company Web service.

The order specification data 601 of the optional device shows contents of an order for the optional devices that are included in the order specification data 401 of the custom-ordered system equipment in FIG. 4. This order for the optional devices needs to be placed with the C Company Web service. Device types of the order specification data 601 are determined on the basis of the additional optional devices in the order specification data 401 of the custom-ordered system equipment. In this example, "memory" and "NIC" are specified. In addition, the number of orders is specified to be "3", which is the same as that of the order specification data 401 of the custom-ordered system equipment. As for the delivery date, after the basic configuration equipment and the optional device are delivered, on the basis of the values of the order specification data 401 of the custom-ordered system equipment in FIG. 4, a value obtained by subtracting a period of time required for assembling is specified.

In this embodiment, contents of the progress information request data (for the A Company Web service) 502 and the progress information request data (for the B Company Web service) 503, which are shown in FIG. 6, are the same as those of the progress information request data 502 and 503 included in the data of the order for the basic configuration equipment which is transmitted from the B Company Web service to the C Company Web service.

In the order specification data 601 of the optional device, a device type, the number of orders, and the delivery date are specified twice as the order specification data of the optional device.

FIG. 8 is a diagram illustrating contents of the progress information notification data 801 of the B Company Web service, which is transmitted to the A Company Web service when a state of the B Company Web service changes. Reference numeral 1002 of FIG. 10 denotes definitions in the format of the progress information notification data 801 of the B Company Web service. Reference numerals 803 through 811 shown in FIG. 8, which are defined in the definitions of progress information notification data 1002, denote respectively the following items: a requester of status check, a target service, a requester ID, progress information notification including a current status, a service ID that is a detailed item of the current status, a service name, the date and time, target processing, and a state. Each of the above-mentioned items will be described in detail by use of examples as below.

Reference numeral 802 in FIG. 8 denotes progress information notification, which includes information from the requester of status check 803 to the current status 806.

The requester of status check 803 indicates a requester that has requested the progress information. The contents of the requester of status check 803 become the same as those of the destination of progress information notification 404 in the progress information request data 402.

The target service 804 indicates a target of the progress information which is specified by the progress information notification data 801. In this case, an URL indicating the B Company Web service is specified.

Reference numeral 805 denotes a requester ID. Contents specified as the requester ID 805 are the same as those of the requester ID 405 in the progress information request data 402.

This information enables a requester of progress information to identify an order corresponding to the progress information.

The current status 806 shows a status after a change instate in the B Company Web service. The current status 806 includes information from the service ID 807 to the state 811.

The service ID 807 is an ID used to identify a target in the B Company Web service. When a request for the newest progress state is transmitted from the A Company Web service to the B Company Web service in arbitrary timing except at the time of receiving, or when history information is requested, the progress information notification data 801 can be used to specify a target.

The service name 808 is a service name of the B Company Web service. When progress information collected from a plurality of Web services is displayed in the A Company Web service, using this name makes it possible to indicate how the Web services correspond to the progress information.

The date and time 809 indicates the date and time when a state has changed.

If a business process in the B Company Web service includes a plurality of operation steps, the target processing 810 indicates a name of an operation step, a state of which has changed.

The state 811 indicates a current state of the target processing 810 after the state has changed. The state 811 is provided with one of values each indicating a state. The values include "completed", "being executed", "being stopped", "waiting for receiving", "not executed", "forcedly stopped", "external request is stopped", "abnormally ended", "execution is omitted", or the like.

The progress information service 812 indicates a Web service to which an inquiry is sent. The progress information service 812 is used, for example, when it is necessary to send an inquiry about the newest progress information to the B Company Web service.

FIG. 11 illustrates a table for managing progress information request data that is transmitted to the B Company Web service.

A destination of progress information notification 1101, a requester ID 1102, a degree of details of return information 1103, and a hierarchical level 1104 are items that correspond to the items 404, 405, 406, 407 of the progress information request data 402 of the A Company Web service. The service ID 1105 is data that is obtained as a result of unique numbering in a service. When a state of a transaction is changed, the service ID 1105 is used to identify a destination of progress information notification.

FIG. 12 illustrates a table for managing progress notification information of the B Company Web service. The service ID 1201 has the same value as that of the service ID 1105. The service ID 1201 is data that is obtained as a result of unique numbering in a service. A transaction name 1202, target processing 1203, a person in charge 1204 are information used for management in the B Company Web service. A progress information service 1205, a target service ID 1206, a target service name 1207, the target update time 1208, target processing 1209, and a target state 1210 are areas for storing progress information notified by the other Web services.

FIG. 13 illustrates a table for managing progress notification information of the A Company Web service. Contents of items 1301 through 1310 are similar to those of the items 1201 through 1210 in the progress notification information of the A Company Web service.

Figure 7:
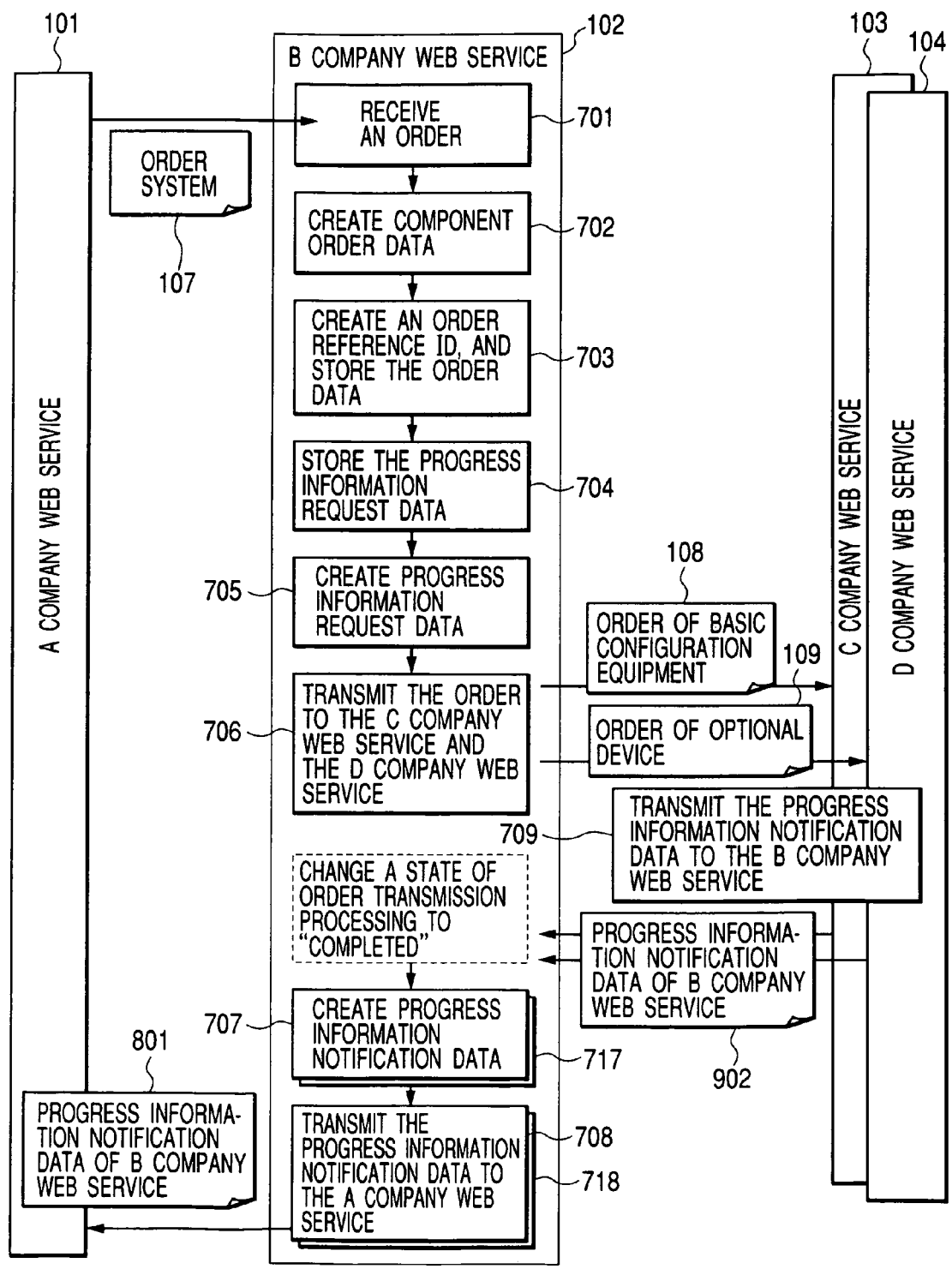
FIG. 7 is a diagram illustrating a process flow of the B Company Web service.

FIG. 7 is a flowchart illustrating a series of processing from the time when the B Company Web service has received an order of the custom-ordered system equipment 107 from the A Company Web service 101 until the B Company Web service returns progress data to the A Company Web service.

As soon as the B Company Web service receives an order of custom-ordered system equipment 107 by use of the order and request receiving unit 207 (step 701), the B Company Web service checks contents of order data, and then creates, as component order data, the order specification data 501 of the basic configuration equipment, which is transmitted to the C Company Web service, and the order specification data 601 of an optional device, which is transmitted to the D Company Web service (step 702).

Next, a unique ID is created as an ID corresponding to the order of the custom-ordered system equipment 107. Then, the order data is stored in the order information storing area 209 shown in FIG. 3 (step 703). In addition, contents of the progress information request data 402 are stored in a progress information request management table 1100 (for the B Company Web service) in the progress and history information storing area 211 shown in FIG. 3 (step 704).

In the progress information request data 402 requesting progress information to be transmitted to the A Company Web service, the hierarchical level indicates two stages. Therefore, the progress information request data 502 is created. In this case, the progress information request data 502 shows a request for progress information to be transmitted to the A Company Web service from the C Company Web service and the D Company Web service, with which the B Company Web service has placed the orders for components. At this time, the hierarchical level 505 is specified to be "1" as a result of decrementing by one. At the same time, the progress information request data 503 which requests progress information to be transmitted to the B Company Web service is created. For the purpose of managing the association of the progress information notification data from the C Company Web service with that from the D Company Web service, the progress information request management table 1100 of the B Company Web service stores information including the service ID 1201, the transaction name 1202 of a transaction managed in the B Company system, the target processing 1203, and the person in charge 1204 (step 705). The service ID 1201 is the ID created in the step 703.

The order data created in the step 702 combined with the progress information request data created in the step 705 is transmitted to the C Company Web service 103 as data of the order of the basic configuration equipment 108 to be transmitted to the C Company Web service, and to the D Company Web service 104 as data of the order of optional device 109 to be transmitted to the D Company Web service (step 706).

On the completion of the step 706, a state of component order transmission processing of the B Company Web service is changed to "completed". Because the state is changed, the B Company Web service searches for a destination of progress information notification using as a key the service ID 1105 of the progress information request management table of the B Company Web service. After that, on the basis of the progress information request data 402 from the A Company Web service, the B Company Web service creates the progress information notification data 801 shown in FIG. 8, which indicates a progress state in the B Company Web service (step 707), and then transmits the progress information notification data 801 to the A Company Web service (step 708).

In addition, as for the C Company Web service, when a state is changed (for example, when the basic configuration equipment which is the ordered product is dispatched), on the basis of the progress information request data 502 from the B Company Web service, by means of processing similar to the processing steps 707 and 708 in the B Company Web service, the C Company Web service creates the progress information notification data 901 of the C Company Web service, and then transmits the progress information notification data 901 to the B Company Web service (step 709).

The B Company Web service, which has received the progress information notification data 902 of the C Company Web service, stores information of the progress information notification data 902 of the C Company Web service in the progress notification information management table 1200 of the B Company Web service. At the same time, the B Company Web service searches the progress information request management table 1100 of the B Company Web service for the service ID 1105, and thereby identifies a destination of progress information notification. Then, as is the case with the step 707, the B Company Web service creates the progress information notification data shown in FIG. 8, which shows a change in progress status in the B Company Web service (step 717). In the progress information notification data which is created in the step 717, the date and time 809, the target processing 810, and the state 811, of the progress information notification data 801, which has been transmitted from the B Company Web service to the A Company Web service in advance, are changed according to the progress information notification data 902 of the C Company Web service. Their values, therefore, are replaced with "Aug. 8, 2002 8:00:00", "receipt of delivery notification of basic configuration equipment", and "completed" respectively.

The progress information notification data of the B Company Web service, which has been created in the step 717, is transmitted to a destination indicated by the destination of progress information notification 1101 in the progress information request management table 1100 of the B Company Web service (step 718).

In the A Company Web service, the progress information notification data which is notified in the steps 708 and 709, and the progress information notification data which is notified from the C Company Web service, are stored in a progress notification information management table 1300 of the A Company Web service shown in FIG. 13.

When a person in charge of the A Company checks progress, contents of the progress notification information management table 1300 of the A Company Web service are referred to.

As described above, by setting progress information request data in the format as shown in the progress information request data 402 in FIG. 4, and then by transmitting the set progress information request data together with information used to realize functions of a Web service, it is possible to notify progress information by use of a data format, which is common to a plurality of Web services, without individually creating an interface of progress information among individual Web services to create processing that is specific to the individual Web services. Transmitting a progress information request together with a service request for realizing the functions of a Web service makes it possible to individually choose an interface of progress information among Web services.

According to the present invention, it becomes possible to dynamically control the obtaining of history information and progress information.

What is claimed:

1. A service processing method used in a computer system, said computer system comprising a series of computers, wherein each of the series of computers receives a message, executes an individual service based on the received message, and then outputs at least one message generated from the result of the execution, said computer system realizing a series of services in a coordinated manner by transmitting and receiving the messages along the series of computers, said method implemented in one of the series of computers, said method comprising the steps of:

receiving, from a preceding upstream computer, a message including first information regarding a service execution request from the preceding upstream computer, and second information regarding at least one notification request of progress information issued from each upstream computer, wherein said at least one notification request of progress information includes a hierarchical level indicating the extent of downstream level to which each upstream computer requests the notification of progress information and a degree of details indicating in what detail each upstream computer expects the progress information to be returned;

executing said individual service according to the first information;

analyzing the second information, then based on the execution result of the individual service, generating at least one message according to the second information, and then transmitting the generated message to each of the upstream computers that is identified by a destination of progress information notification included in each at least one notification request of the second information; and transmitting, to each following downstream computer, a message including a service execution request for the following downstream computer, the second information to be passed through regarding said at least one notification request from each of the upstream computers, and said notification request of progress information to be reported to said one of the series of computers, wherein the second information includes a decremented hierarchical level generated by decreasing the hierarchical level received from the preceding upstream computer by one, when the hierarchical level received from the preceding upstream computer indicates a plural number and the following downstream computer exists at the extent of downstream level to which each upstream computer requests the at least one notification of progress information.

2. A computer program product used in a computer system, the computer system comprising a series of computers, wherein each of the series of computers receives a message, and executes an individual service based on the received message and then outputs at least one message generated from the result of the execution, said computer system realizing a series of services in a coordinated manner by transmitting and receiving the messages along the series of computers, the computer program product comprising:

a computer program; and a non-transitory computer-readable storage medium having the computer program tangibly embodied thereon, wherein the computer program causes one of the series of computers to perform the steps of:

receiving, from a preceding upstream computer, a message including first information regarding a service execution request from the preceding upstream computer, and second information regarding at least one notification request of progress information issued from each upstream computer, wherein said notification request of progress information includes a hierarchical level indicating the extent of downstream level to which each upstream computer requests the notification of progress information and a degree of details indicating in what detail each upstream computer expects the progress information to be returned;

executing said individual service according to the first information;

analyzing the second information, then based on the execution result of the individual service, generating at least one message according to the second information, and then transmitting the generated message to each of the upstream computers that is identified by a destination of progress information notification included in each at least one notification request of the second information; and transmitting, to each following downstream computer, a message including a service execution request for the following downstream computer, the second information to be passed through regarding said at least one notification request from each of the upstream computers, and said notification request of progress information to be reported to said one of the series of computers, wherein the second information includes a decremented hierarchical level generated by decreasing the hierarchical level received from the preceding upstream computer by one, when the hierarchical level received from the preceding upstream computer indicates a plural number and the following downstream computer exists at the extent of downstream level to which each upstream computer requests the at least one notification of progress information.

* * * * *